United States Patent
Pai-Paranjape et al.

(10) Patent No.: US 7,157,129 B2
(45) Date of Patent: Jan. 2, 2007

(54) METHOD FOR MAKING HIGHLY COLORED DVDS

(75) Inventors: Vandita Pai-Paranjape, Evansville, IN (US); Philippe Schottland, Evansville, IN (US); Verghese Thomas, Evansville, IN (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 10/946,847

(22) Filed: Sep. 22, 2004

(65) Prior Publication Data

US 2005/0089667 A1    Apr. 28, 2005

Related U.S. Application Data

(60) Provisional application No. 60/514,230, filed on Oct. 24, 2003.

(51) Int. Cl.
*B41M 3/02* (2006.01)
(52) U.S. Cl. .................. 428/64.4; 430/270.11
(58) Field of Classification Search ............... 428/64.4; 430/270.11
See application file for complete search history.

(56) References Cited

U.S. PATENT DOCUMENTS

| | | |
|---|---|---|
| 3,635,895 A | 1/1972 | Kramer |
| 4,001,184 A | 1/1977 | Scott |
| 4,217,438 A | 8/1980 | Brunelle et al. |
| 4,891,800 A | 1/1990 | Sugaya |
| 5,142,018 A | 8/1992 | Sakashita et al. |
| 5,648,197 A * | 7/1997 | Kuroda .................. 430/270.11 |
| 5,840,395 A | 11/1998 | Sawada et al. |
| 6,219,329 B1 | 4/2001 | Tanaka et al. |
| 6,461,711 B1 * | 10/2002 | Ishida et al. ................ 428/64.1 |
| 6,475,588 B1 | 11/2002 | Schottland et al. |
| 6,475,589 B1 | 11/2002 | Pai-Paranjape et al. |
| 6,623,827 B1 | 9/2003 | Schottland et al. |
| 6,771,578 B1 * | 8/2004 | Cradic et al. ............. 369/59.11 |
| 6,815,030 B1 * | 11/2004 | Ishida et al. ................ 428/64.1 |
| 2003/0124351 A1 * | 7/2003 | Sakamoto et al. .......... 428/401 |

FOREIGN PATENT DOCUMENTS

| | | |
|---|---|---|
| EP | 0737965 | 10/1996 |
| EP | 1236758 A1 | 9/2002 |

OTHER PUBLICATIONS

PCT Search Report for International Application No. PCT/US2004/033509.

* cited by examiner

*Primary Examiner*—Bruce H. Hess

(57) ABSTRACT

Embodiments of highly colored optical discs and methods for making the same are disclosed. For examples, specification discloses a DVD composition that comprises a bonding layer and a data layer disposed there between, wherein at least one of the substrates is a read side substrate comprising a highly colored polycarbonate comprising an optical quality polycarbonate resin and a colorant formulation in the range of 0.1 to 0.4 wt % of the highly colored polycarbonate.

12 Claims, 2 Drawing Sheets

Plot of % Yields vs. Metal Impurities

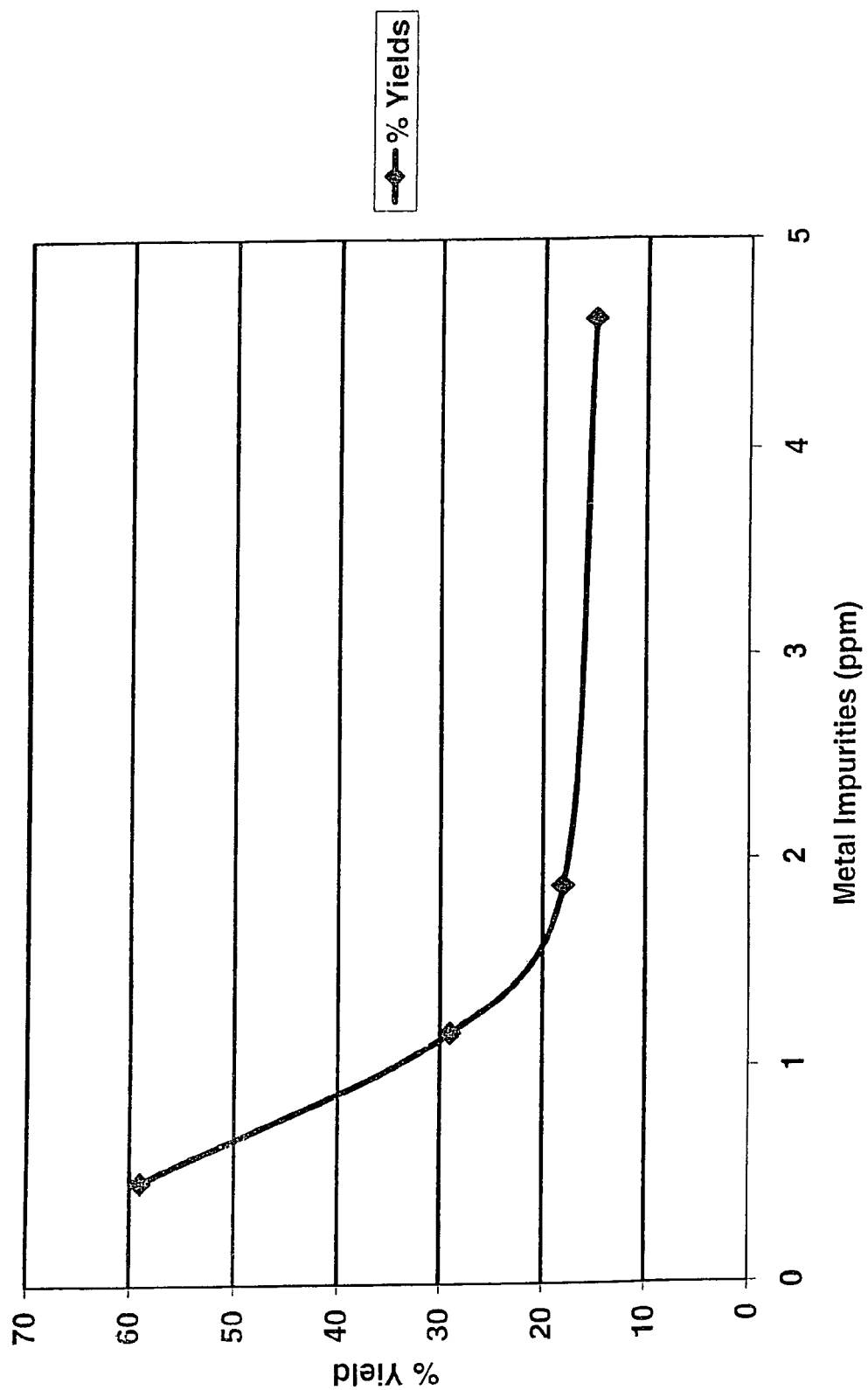

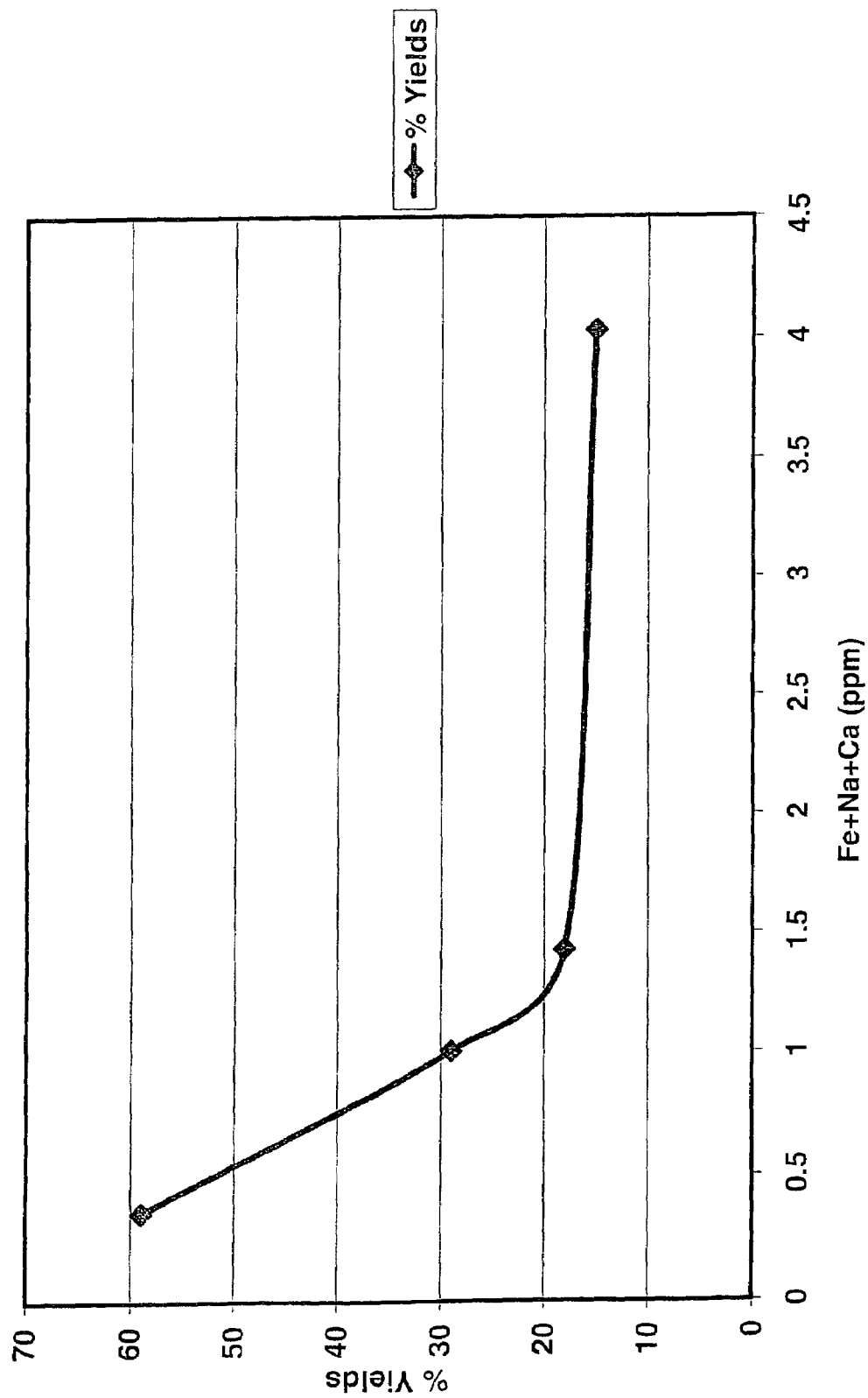

METHOD FOR MAKING HIGHLY COLORED DVDS

This application claims the benefit of U.S. provisional application No. 60/514,230, filed Oct. 24, 2003, which is incorporated herein in its entirety.

BACKGROUND

This disclosure relates to a data storage media, and especially relates to a highly colored data storage media and methods for making same.

Digital Versatile Disks (or DVDs) provide significantly more storage capacity than CDs thus allowing the recording of up to 8 hours of video/audio content with high digital quality. For this reason DVDs are steadily growing in market volume. The number of DVDs sold on the market is expected to reach about 4 billion by 2004.

To achieve the high storage density in a disk that has the same overall dimensions as a CD, the disk construction has been changed. The most fundamental and visible difference is that a DVD is no longer made of a single 1.2 mm thick plastic substrate but of two 0.6 mm halves that are bonded together ("DVD Demystified:" by Jim Taylor, ed. McGraw Hill, 1998). In addition, the reading laser wavelength has changed from 780 nanometers (nm) in CDs, which is located in the near infrared part of the spectrum, to 635 or 650 nm for DVDs that is located in the visible spectrum. Depending on the type of DVD format (DVD-5, DVD-9, DVD-10, DVD-14, DVD-18, DVD-R, DVD-RW, etc.), the construction can vary substantially, going from a single side/single layer (DVD-5) to double side/double layer (DVD-18), not to mention the recordable formats such as DVD-R and DVD-RW. The tight specifications, e.g., imposed by the Optical Media consortium (European Association for Standardizing Information and Communication Systems ("ECMA") Specifications #267 for 1.20 mm DVD-Read only disk), make DVD manufacturing a challenge. One specification requires that all DVDs show a PISUM8 test value (measurement of reading errors) of less than 280 even after temperature and humidity environmental aging. However, most optical disc manufacturers have even more stringent requirements and do not tolerate initial PISUM8 values of more than about 140 with an average value of less than 50.

The optical properties of the substrate are not the only requirements for DVDs. For example, the size of a data pit is much smaller in a DVD than a CD, which means that a DVD is more sensitive to resin quality (impurities) than a CD. Moreover, due to their thinner gage (0.6 mm instead of 1.2 mm), DVDs are also more challenging to mold than CDs. Therefore, the rheology (flow characteristics) of the resin used to make DVDs is important and must be tightly controlled. Additionally, inconsistencies in the thickness of the disk body are also a source of defects in optical disks. A DVD is much more sensitive to the presence of such defects because it is not only thinner and read in the visible spectrum, but it is also read at a higher rotational/scanning speed than a regular CD. The most advanced multi-layered DVD formats (i.e., DVD-9, DVD-14 and DVD-18) represent the highest degree of manufacturing difficulty because of the presence of both a fully reflective and a semi-reflective layer associated with 2 layers of pits. Single layered DVD formats (i.e., DVD-5 and DVD-10), do not have the semi-reflective layer and contain only one layer of pits. Because of the differences in the disk construction, reflectivity requirements are very different between single layered and multi-layered disks.

The challenges of making high quality DVDs become greater still when colored resins are employed in the substrate layers because of the varying quality of the available colorants. For this reason, DVDs have not generally been made with colored resins. Recently a new DVD product has been introduced to the market under the trademark EZ-D™. This DVD employs special colorants to limit the number of playable hours of a rented film in a DVD format. Several days after removal from its packaging, disk color changes from red to black preventing reading of the data by the laser, and the disk is rendered unplayable. With the exception of this specialized use of colorants, colored DVDs have not been generally available to the market except when the color effect was achieved by metallization (i.e., the data layer). For example a gold disk is obtained when gold is used instead of the typical aluminum reflective layer, and similarly, a bright silver look is obtained with silver or a silver alloy. Also, DVDs have been available in single-sided formats with colorants in substrates that were not intended to be read through during use of the DVD. Colored CD's are also known and commercially available for use with Sony Playstation I and II game consoles. These CD's have had a maximum dye loading in the read side substrate of 0.13 weight percent.

DVDs presently found on the market are largely made using clear (colorless) resins. These disks show good optical/electrical properties (reflectivity, jitter, parity inner (PI) errors, birefringence, etc.) as well as good mechanical properties (radial/tangential/vertical tilt), even after aging at 80° C. at 85% relative humidity (RH) for 4 days. The absence of highly colored DVDs in the marketplace, in spite of high customer interest to have such aesthetically pleasing products, has been the result of having no reliable means to ensure that the highly colored DVDs produced would consistently meet the optical and electrical properties and aging characteristics required by the optical media industry.

In general, to achieve an aesthetically pleasing appearance in the DVDs, colorant loadings of greater than 0.15 weight % relative to the weight of the resin are needed depending on the type of colorant and the appearance desired. But colorants vary widely in their impurity contents, especially in their metal impurity contents. At high colorant loadings these metal impurities can adversely affect the short-term properties and long-term aging characteristics of the highly colored DVDs.

The metal impurities present in colorants and highly colored resin formulations useful for DVDs fall into two categories: those which are larger than 10 microns, and those that are less than 10 microns or are soluble in the highly colored resin formulation. The removal of the metal impurities that are greater than 10 microns can be achieved by those skilled in the art using a series of melt filters with a screen size of around 10 microns during the melt extrusion of the resin. The removal of metal present which are less than 10 microns, or that are soluble in the highly colored resin formulation is much more difficult because these particles pass through conventional extrusion filters during the extrusion process. Very fine mesh size, specialty extrusion filters can remove more of the very small metal particles but their use can create severe production rate penalties, which can make the cost of producing the highly colored resin formulations prohibitively expensive. Also, if the metal impurities are soluble in the highly colored resin formulation, they cannot be removed by any filtration method. Another solution available to a resin manufacturer who wants to produce a highly colored resin for use in DVDs is to employ highly purified dyes such as those used in electronic applications. Such dyes possess 10 ppm or less metal impurities. But this solution adds prohibitively high costs to the highly colored resin formulations intended for use in DVDs. Moreover, electronic grade dyes are only available in limited colors.

SUMMARY

Disclosed herein are economical methods for making high quality, highly colored DVDs and highly colored DVD articles. Various DVD constructions are shown in U.S. Pat. No. 6,475,588, which is incorporated herein by reference.

One example of a method comprises combining an optical quality polycarbonate resin with a colorant formulation to form a highly colored polycarbonate mixture wherein the colorant formulation is present in an amount of more than 0.15 wt % of the highly colored polycarbonate mixture. The metal impurities content from the colorant formulation in the highly colored polycarbonate mixture are typically less than 1.90 ppm, and more than 0.04 ppm.

Another method example similarly comprises combining an optical quality polycarbonate resin with a colorant formulation to form a highly colored polycarbonate mixture wherein the colorant formulation is present in an amount of more than 0.15 wt % in the highly colored polycarbonate mixture. In this example the total of the iron, sodium and calcium metal impurities from the colorant formulation in the highly colored polycarbonate mixture is less than 1.90 ppm and more than 0.04 ppm.

An example of a DVD according to the invention comprises a first substrate, a second substrate, a bonding layer and a data layer. The first and second substrates typically form the two major outer surfaces of the DVD, but they can be optionally covered by further layers. The data layer and sending layer are in between the substrates, in any order. The data layer has a shape which corresponds to meaningful data. The shape is configured such that the data may be read by detecting reflections of a laser beam incident upon the first substrate. The first substrate is a highly colored polycarbonate mixture as described above. The highly colored polycarbonate mixture comprises an optical quality polycarbonate resin and a colorant formulation in an amount of at least 0.15 weight % of the highly colored polycarbonate. The total metal impurities are typically less than 2.8 ppm and more than 0.5 ppm. These total metal impurities include the metal impurities originally present in the optical quality polycarbonate resin plus those introduced by adding the colorant formulation. The impurities in the colored polycarbonate mixture introduced through the addition of the colorant formulation are typically less than 1.90 ppm and more than 0.04 ppm.

These and other features will be apparent from the following brief description of the drawings, detailed description, and attached drawings.

BRIEF DESCRIPTION OF DRAWINGS

Referring now to the following Figures, in which:

FIG. 1 is a plot of percent yield of acceptable DVDs versus total metal impurities (ppm) in the highly colored polycarbonate mixture.

FIG. 2 is a plot of percent yield of acceptable DVDs versus total iron sodium and calcium impurities (ppm) in the highly colored polycarbonate mixture.

DETAILED DESCRIPTION

As used herein, the term "DVD" refers to an optical media format (digital video disk) that is either presently commercial or will be commercialized in the future to store digital data. The data typically corresponds to video but may be music or computer program or other data. DVD formats have a storage capacity greater than that of older compact disks (CD's) that were typically used for music files. The term should not be read as corresponding only to present formats or those presently under development.

The term "optical quality polycarbonate resin" refers to a clear polycarbonate resin that is at least sufficiently clean from particulate and other matter to be used in optical media applications. Typical commercial optical quality polycarbonate resins have relatively low melt viscosity and very low levels of dyes. They typically appear colorless.

As used herein the term "colorant formulation" means a substance comprising a colorant. The substance can be a polycarbonate pellet or powder concentrate comprising a colorant (e.g., dye or pigment) or an additive package comprising with a dye or pigment for example. An "additive package" is a term meaning a combination of different chemicals typically added into polycarbonate (e.g., by extrusion) prior to sale. Such chemicals may be stabilizers, mold release agents, etc.

As used herein the term "metal impurities from the colorant formulation" refers to a circumstance wherein a colorant formulation is added to an optical quality polycarbonate resin to form a highly colored polycarbonate mixture. In such cases the optical quality polycarbonate resin typically contains some initial metal impurities even before the colorant formulation is added. The resultant highly colored polycarbonate mixture contains these initial impurities plus those introduced by blending in the colorant formulation. The phrase only refers to the additional impurities carried into the highly colored polycarbonate mixture by the colorant formulation.

As used herein, the term "data layer" refers to that portion of an optical disk corresponding to the data stored in the disk. In a CD-R type construction the data layer comprises a dye disposed in grooves that is chemically changed when the data is "written." In the most basic DVDs the metal layer is contiguous with the substrate and there is no physically separate layer identifiable as the data layer. Such disks still have a "data layer" as the author has chosen to define this term herein—the data layer is the junction having a shape corresponding to the data.

As used hereinafter, the term "highly colored polycarbonate formulations" are defined as those resin formulations, which contain greater than 0.15% of colorants relative to the weight of resin employed.

A method has been discovered that provides a means of achieving highly colored DVD substrate resin formulations which, when employed to produce DVDs, will not jeopardize the quality or the aging characteristics of the resultant highly colored DVD and which eliminates the need for using expensive, highly purified colorants. This method can be successfully employed using one colorant or a mixture of colorants that can be blended into the resin formulation as powders or added as color concentrates. A powder is a relatively pure solid form of the colorant. A color concentrate is a resin comprising the colorant in a more concentrated form than is intended for use in the final product.

Prior to discovery of the method described herein, it was assumed by those skilled in the art that very high purity colorants such as those used in the electronic industry with metal impurities of less than about 10 ppm were required to achieve highly colored DVDs with high quality and good aging characteristics (corresponding a metal impurity level in the highly colored polycarbonate mixture derived from the colorant would be about 0.04 ppm). Contrary to these assumptions, it was discovered that if the colorants employed did not exceed certain total impurity levels, then less expensive colorants of lesser purity could be employed to produce acceptable DVDs.

FIG. 1 illustrates the surprising discovery that there is a critical metal impurity level derived from the colorants in the highly colored resin formulation that impacts the yield of quality DVDs. The highly colored resin formulations were prepared in an extruder without the use of 10 micron filters. Yields were measured on molded DVDs produced from the resin formulation using an inline scanner Dr. Schenk unit, which measures defects like inclusions, surface scratches, bonding defects, tilt etc., and is widely used by the DVD industry to estimate inline process yields. A yield above about 20% was considered to be an acceptable yield in the absence of melt filtration because the use of melt filters would increase this yield to greater than 90%. This critical value to achieve a yield greater than about 20% or greater was found to be about 1.9 ppm of total metal impurities in the resin formulation from the colorants. Yield does not increase sharply with increasing purity until the impurity level goes below 1.9 ppm. After this inflection point, yield increases sharply with increasing purity. Therefore, the electronic grade dyes previously thought to be required are not. Total impurity levels below 1.5 ppm are more preferred.

FIG. 2 illustrates the additional surprising discovery that there is a more stringent critical metal impurity level for a combination of sodium, iron and calcium metal impurities. Yields were measured on molded DVDs produced from the resin formulation using an inline scanner Dr. Schenk unit, which measures defects like inclusions, surface scratches, bonding defects, tilt etc. and is widely used by the DVD industry to estimate inline process yields. A yield above about 20% was considered to be an acceptable yield in the absence of melt filtration because the use of melt filters would increase this yield to greater than 90%. This critical value to achieve greater than about 20% yields was less than 1.50 ppm of combined sodium, iron and calcium from the colorants. A more typical value was below 1.25 ppm.

Therefore, by selecting colorants to be used in a colorant formulation such that the total metal impurities imparted by the colorants to the highly colored resin formulation do not exceed 1.9 ppm total metal, and that the total sodium, iron and calcium impurities imparted by the colorants to the highly colored resin formulation do not exceed 1.5 ppm, it is possible to produce high quality DVDs without using expensive, highly purified colorants. More typically, the highly colored resin formulation does not exceed 1.5 ppm total metal impurities, and the total sodium, iron and calcium metal content is less than 1.25 ppm. These levels are most typically below 1.2 ppm and 1.00 ppm, respectively.

It was also discovered that melt filtration of the reaction mixture using conventional 10 micron filters and extrusion methods well known to those skilled in the art could achieve 95% or greater yields for DVDs produced from highly colored resin formulations provided that in such formulations the total metal impurity content imparted by the colorants to the highly colored resin did not exceed 1.9 ppm, and the combined total of sodium, iron and calcium did not exceed 1.5 ppm. When the above levels were exceeded, 95% yields or greater could not be achieved.

The aging characteristics of DVDs, as determined by the PISUM8 test method also depended on the level of metal impurities present in the highly colored resin formulations. DVDs produced from highly colored formulations that exceeded a total metal impurity level of 1.9 ppm or that exceeded the combined iron, sodium and calcium level of 1.5 ppm were not able to achieve the initial desired PISUM8 maximum value of less than 140 before aging.

Colorants can be dry-blended with the polycarbonate resin or pre-compounded in an extruder to form a colored polycarbonate (typically referred to as "concentrate" or "masterbatch") resin wherein the colorant loading will be between 5 and 1000 times the final colorant loading in the finished optical quality resin. More preferably, the "concentrate" contains a loading of colorant that is between 20 and 400 times or between 50 and 200 times the final colorant loading. In a more typical embodiment, the "concentrate" is in a pelletized form, and is directly fed to the extrusion line via use of a gravimetric feeder to ensure color consistency. It must be noted that concentrates are typically used because the colorants will be exposed to two heat cycles in the presence of mixing elements. Concentrates ensure that the best mechanical dispersion is achieved. Poor dispersion in the polycarbonate resin could be a concern when using colorants having melting points above 300° C. such as some fluorescent perylene derivatives. Whichever colorant formulation or colorant addition method is employed, transparency of the substrate (e.g., greater than or equal to about 60% transparency at the reading wavelength) must be maintained to manufacture a playable DVD meeting industry quality standards.

Transparency of the substrate is directly related to the amount of scattering particles present in the substrate and their size. If they are significantly smaller than the visible wavelength, scattering will not be noticeable. Since the colorants can be a major source of scattering particles, melt extrusion is typically used to make the highly colored polycarbonate mixture. Specifically, a melt filter is affixed to the end of the extruder. Optical quality polycarbonate resin and a colorant formulation can be a masterbatch previously prepared by mixing colorant into optical quality polycarbonate using a different extruder (with or without a melt filter) or a dye powder formulation. The colorant formulation may also include further additives. Preferably, the size of the filtered colorant particles (and aggregates thereof) is less than or equal to about 200 nanometers (nm). A particle (and aggregate) size of less than or equal to about 50 nm is typical.

Colorants are also preferably selected so that they solubilize in the material used to form the layer in which the colorant is disposed. Colorants that are soluble in the materials used for DVD layers include dyes (e.g., "solvent dyes"), organic colorants, pigments, and the like. Colorants that disperse in the plastic and do not form aggregates having a size greater than or equal to about 200 nm are preferred, with an aggregate size less than or equal to about 50 nm being typical. Some suitable colorants include, but are not limited to anthraquinones, anthrapyridones, perylenes, perinones, indanthrones, quinacridones, xanthenes, oxazines, oxazolines, thioxanthenes, indigoids, thioindigoids, quinophthalones, naphtalimides, cyanines, methines, lactones, coumarins, bis-benzoxaxolylthiophenes (BBOT), napthalenetetracarboxylic derivatives, monoazo pigments, disazo pigments, triarylmethanes, aminoketones, bis(styryl)biphenyl derivatives, and the like, as well as combinations comprising at least one of the foregoing.

Factors in determining the plastic/colorant combination and the amount of colorant employed are currently based upon the above-mentioned DVD specifications (e.g., EMCA Specifications #267 which are incorporated herein by reference). In order to obtain a semi-reflective data layer and a fully reflective data layer reflectivity within specifications for a colored multi-layered DVD, the light transmission and colorant concentration must be balanced. The light transmission through the first substrate at the DVD readback laser wavelength is preferably greater than or equal to about 60%. The colorant loading, as well as colorant nature (e.g., the shape of the spectral transmission curve), are dependent on the target color and light transmissivity.

Selection of colorants with high absorptivity at the desired wavelength limits the maximum colorant loading possible to yield a functional multi-layered DVD. Since colorants with a lower absorptivity at the desired wavelength can be used at higher loadings in the formulation it becomes easier to obtain the target color in a functional disk. For example, Solvent Violet 13 is typically used instead of Solvent Blue 97 to achieve a blue color because of its lower absorptivity at 650 nm. Selection of appropriate colorants is further discussed in U.S. Pat. No. 6,475,589, which is incorporated herein by reference.

The colorant loading for a highly colored DVD is typically greater than or equal to 0.15 weight percent (wt %) or 0.25 wt % or 0.35 wt % based upon the total weight of the substrate comprising the colorant. The acceptable upper limit of dye content will vary and can be determined by experimenting with greater amounts until unacceptable DVD yields are achieved. It is further typical to employ colorants in an amount of less than or equal to 3.0 wt %, less than or equal to 2.0 wt %, less than or equal to 0.5 wt %, or less than or equal to 0.4 wt %.

A typical digital versatile disk (DVD) comprises two bonded plastic substrates (or resin layers), each typically having a thickness less than or equal to about 1.0 millimeter (mm), or less than or equal to about 0.7 mm. A thickness of greater than or equal to about 0.4 mm is typical. Most DVDs are made from two halves, each having a thickness of 0.6 mm, that together form a DVD with a total thickness of 1.2 mm. At least one substrate comprises one or more layers (e.g., 3' 5), of data. The read substrate, generally called layer zero (or L0), is closest to the side of the disk from which the data is read. The other layer, generally called layer 1 (L1), is further from the read surface. Disposed between L0 and L1 are typically an adhesive and optionally a protective coating or separating layer. Single-sided DVD's (i.e., those that will be read from a single surface disposed on one side of the DVD), can additionally comprise a label disposed on the back side protective substrate of the DVD opposite the readout surface. There may optionally be further layers external to the back side protective substrate. In any case, all presently known DVDs have at least a first and a second substrate.

In the case of a single-sided DVD having a single data layer (e.g., DVD 5, DVD 10), a stamped surface having a shape corresponding to data or a chemical that can be altered to have properties corresponding to the data is covered with a thin reflective metal layer by a sputtering or other deposition process. This creates a metallic coating typically about 60 to about 100 angstroms (Å) thick. For single-sided data layer DVDs (e.g. DVD 9, DVD 14, DVD 18), the laser must be able to reflect from the first layer when reading it, but also focus (or transmit) through the first layer when reading the second layer. Therefore, the first reflective layer is "semi-transparent" (i.e., semi-reflective), while the second reflective layer encountered by an incident laser is "fully-reflective." Under current standards set by the Consortium for Optical Media, metallization combination for the fully-reflective and semi-reflective data layers, as measured per the electrical parameter R14H (as described in ECMA specifications #267), should be about 18 percent (%) to about 30% at the wavelength of the laser. Similarly, for single-layer DVD formats, R14H should be between 45% and 85%. In the present DVDs, the laser wavelength generally employed is less than or equal to about 700 nm, with about 400 nm to about 675 nm typical, and about 600 nm to about 675 nm more typical. Although these metallization standards were set for DVD data layers employed with colorless, optical quality resin, they are equally applied to DVD systems with colored resin.

When color is added to the resin, light transmission through and reflected from the substrate is effected. For multi-layer DVDs the metallization and thickness on the semi-reflective and fully reflective layers are adapted for the light transmission of the substrate. Desired reflectivity can be obtained by balancing the metallization thickness with the reflectivity of the semi-reflective data layer, and by adjusting the thickness of the fully reflective data layer to ensure its reflectivity is within the desired specification. This process is described, for example in U.S. Pat. No. 6,475,588.

Metallization for the individual data layer(s) can be effected using various reflective materials such as metals, alloys, and the like. Preferred metallization materials have sufficient reflectivity to be employed as the semi-reflective and/or fully reflective data layers, and can be sputtered onto the substrate. Gold, silver, platinum, silicon, aluminum, and the like, as well as alloys and combinations comprising at least one of the foregoing materials are potentially useful reflective materials. For example, the first/second reflective data layer metallization can be gold/aluminum, silver alloy/aluminum, silver alloy/silver alloy, or the like.

In addition to the overall reflectivity of each layer, the difference in reflectivity between subsequent reflective data layers should be controlled, in order to ensure sufficient reflectivity of the subsequent layer. Preferably, the difference in reflectivity between subsequent layers is less than or equal to 5%, or 4% or 3%. It is typical to have a reflectivity difference between the adjacent reflective data layers of greater than or equal to 0.5% or 1%. It should be noted that although described in relation to two layers, it is understood that more than two layers could be employed, and that the difference in reflectivity between subsequent layers should be as set forth above. This is described, for example in U.S. Pat. No. 6,475,588.

The reflective data layers are typically sputtered or otherwise disposed on a pattern (e.g., surface features such as pits, grooves, asperities, start/stop orientor, and/or the like) formed into a surface of the substrate via molding, embossing, or the like. A semi-reflective data layer can be created by sputtering over a first patterned substrate surface. A separator layer can then be disposed over the semi-reflective data layer. If a multiple data layer DVD (e.g., DVD 14, DVD 18, or the like) is to be formed, a $2^{nd}$ patterned surface can be formed (e.g., stamped or the like) in the side of the separator layer opposite the semi-reflective data layer. A fully reflective data layer can then be sputtered or otherwise deposited on the separator layer. Alternatively, for DVD 14 construction, the fully reflective data layer can be deposited on a patterned surface of a $2^{nd}$ substrate (or resin layer). A separate layer or protective coating is then disposed on one or both of the semi-reflective data layer and the fully reflective data layer. A bonding agent or adhesive can then be disposed between the two substrates and they can be bonded together to form a disk. Optionally, several semi-reflective data layers can be deposited with a separator layer between each subsequent layer.

The reflectivity of the reflective data layer(s) can be about 5% to about 100%, depending upon the number of reflective layers. If a single reflective data layer is employed, the reflectivity is preferably 30% to 100% or 35% to 90% or 45% to 85%. If a dual reflective data layer is employed, the reflectivity of the data layers is preferably 5% to 45%, 10% to 40% or 15% to about 35% or 18% to 30%. Finally, if multiple reflective data layers (e.g., more than two reflective data layers readable from a single reading surface) are employed, the reflectivity is preferably 5% to 30% or 5% to 25%. The ECMA specification #267, ranges are 18% to 30% reflectivity for a dual layered DVD (e.g., at least one fully reflective layer and at least one semi-reflective layer), and 45% to 85% for a single-layer DVD having one fully reflective layer.

The substrate can comprise any optical quality plastic that enables the transmission of 60% to less than 94% of light in the wavelength region of the laser. Within that transmission range, the transmissivity is preferably greater than or equal to 70% or 74% or 78%. Depending upon the type and amount of colorant employed, the transmissivity can be less than or equal to 92% or 88% or 85% depending upon the type of colorant. It should be noted that as the transmissivity in the UV-A region (i.e., below 400 nm) of the colored substrate decreases, the ability to attain the desired adhesion of the substrates becomes more difficult.

The plastic substrate can comprise a resin such as an amorphous, crystalline, or semi-crystalline thermoplastic, a thermoset, or a combination comprising at least one of the foregoing plastics. Some possible plastics include polyetherimides, polyetheretherketones, polyimides, polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, polyethersulfones, polyetherethersulfones, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon copolymers (e.g., Teflons), epoxy, phenolic, alkyds, polyester, polyimide, polyurethane, polysiloxanes, polysilanes, bis-maleimides, cyanate esters, vinyl, and benzocyclobutene resins, in addition to blends, copolymers, mixtures, reaction products and composites comprising at least one of the foregoing resins. Preferably, the substrate comprises polycarbonate, with a primarily polycarbonate (e.g., greater than or equal to about 80% polycarbonate) substrate especially typical.

As used herein, the terms "polycarbonate", "polycarbonate composition", and "composition comprising aromatic carbonate chain units" includes compositions having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$-A^1-Y^1-A^2-$ (II)

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

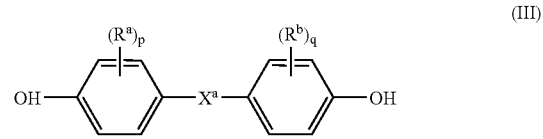

(III)

wherein $R^a$ and $R^b$ each represent a halogen atom or a monovalent hydrocarbon group and may be the same or different; p and q are each independently integers from 0 to 4; and $X^a$ represents one of the groups of formula (IV):

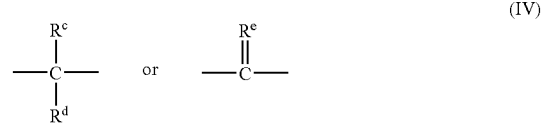

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)methane; 2,2-bis(4-hydroxy-1-methylphenyl)propane; 1,1-bis(4-hydroxy-t-butylphenyl)propane; bis(hydroxyaryl) alkanes such as 2,2-bis(4-hydroxy-3-bromophenyl)propane; 1,1-bis(4-hydroxyphenyl)cyclopentane; and bis(hydroxyaryl)cycloalkanes such as 1,1-bis(4-hydroxyphenyl) cyclohexane; and the like, as well as combinations comprising at least one of the foregoing compounds.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A typical aliphatic diacid is dodecandioic acid. Polyarylates and polyestercarbonate resins or their blends can also be employed. Branched polycarbonates are also useful, as well as blends of linear polycarbonates and a branched polycarbonate. The branched polycarbonates may be prepared by adding a branching agent during polymerization.

These branching agents may comprise polyfunctional organic compounds containing at least three functional groups that may be hydroxyl, carboxyl, carboxylic anhydride, haloformyl, and mixtures comprising at least one of the foregoing groups. Specific examples include trimellitic acid, trimellitic anhydride, trimellitic trichloride, tris-p-hydroxy phenyl ethane, isatin-bis-phenol, tris-phenol TC (1,3, 5-tris((p-hydroxyphenyl)isopropyl)benzene), tris-phenol PA (4(4(1,1-bis(p-hydroxyphenyl)-ethyl)alpha,alpha-dimethylbenzyl)phenol), 4-chloroformyl phthalic anhydride, trimesic acid and benzophenone tetracarboxylic acid, and the like. The branching agents may be added at a level of about 0.05 to about 2.0 weight percent, based upon the total weight of the resin. Branching agents and procedures for making branched polycarbonates are described in U.S. Pat. Nos. 3,635,895 and 4,001,184. All types of polycarbonate end groups are herein contemplated.

Typical polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000, more preferably about 10,000 to about 65,000, and most preferably about 15,000 to about 35,000.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

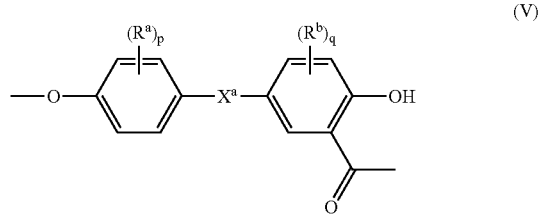

wherein $X^a$ is a bivalent radical as described in connection with formula (III) described above.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate, and trimethyl phosphate. Examples of antioxidants include octadecyl-3-(3,5-di-tert-butyl-4-hydroxyphenyl)propionate), and pentaerythrityl-tetrakis [3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

In addition to the polymer and coloring material, the composition may optionally include various additives ordinarily incorporated in resin compositions of this type. Such additives may include UV absorbers; stabilizers, such as light and thermal stabilizers (e.g., acidic phosphorous-based compounds); hindered phenols; zinc oxide, zinc sulfide particles, or combination thereof; lubricants (mineral oil, and the like); plasticizers; antioxidants; anti-static agents (tetra alkylammonium benzene sulfonate salts, tetra alkylphosphonium benzene sulfonate salts, and the like); mold releasing agents (pentaerythritol tetrastearate; glycerol monstearate, and the like); and the like, and combinations comprising at least one of the foregoing additives. For example, the substrate can comprise about 0.01 weight percent wt % to about 0.1 wt % heat stabilizer; about 0.01 wt % to about 0.2 wt % antistatic agent; and about 0.1 wt % to about 1 wt % mold releasing agent; based upon the total weight of the polymer.

Some possible antioxidants include, for example, organophosphites, e.g., tris(nonyl-phenyl)phosphite, tris(2,4-di-t-butylphenyl)phosphite, bis(2,4-di-t-butylpehnyl)pentaerythritol diphosphite, distearyl pentaerythritol diphosphite and the like; alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations comprising at least one of the foregoing antioxidants.

In order to aid in the processing of the polymer, particularly polycarbonate, catalyst(s) may also be employed, namely in the extruder or other mixing device. The catalyst typically assists in controlling the viscosity of the resulting material. Possible catalysts include hydroxides, such as tetraalkylammonium hydroxide, tetraalkylphosphonium hydroxide, and the like, with diethyldimethylammonium hydroxide and tetrabutylphosphonium hydroxide typical. The catalyst(s) can be employed alone or in combination with quenchers such as acids, such as phosphoric acid, and the like. Additionally, water may be injected into the polymer melt during compounding and removed as water vapor through a vent to remove residual volatile compounds.

The polymer is produced by using a reaction vessel capable of adequately mixing various precursors, such as a single or twin screw extruder, kneader, blender, or the like. The polymer is then formed, via a molding, extrusion, rolling, stamping, or similar techniques, into a substrate.

Adjacent substrates are attached together with an adhesive or bonding agent (e.g., separator or bonding layer). Any bonding agent having the desired optical qualities can be employed. Some possible bonding agents include glue (e.g., hot glue), acrylic resin (e.g., ultra-violet (UV) curable acrylic resin, with transparent (i.e., greater than or equal to UV curable acrylic resin typical), and the like, as well as combinations comprising at least one of the foregoing bonding agents.

As with the bonding agent, the separating layer can comprise a transparent material. Some possible separating layers include UV curable transparent resins. Typically, the separating (bonding) layer is up to or exceeding several hundreds of micrometers (μm) thick, with a thickness of less than or equal to about 100 μm useful, and a thickness of about 40 μm to about 70 μm typically employed with current DVD formats.

In addition to the reflective layers and separator layer(s), layers such as protective layer(s) (e.g., lacquers, and the like), ultra-violet (UV) inhibitor layer(s), moisture barrier layer(s), ductility layer(s), and the like, as well as combinations comprising at least one of these layers, can be employed.

The disclosure is further illustrated by the following non-limiting examples.

EXAMPLES

Several examples are provided testing DVDs made from testing colored polycarbonate resin formulations A-G as described below. For cases where the formulations were prepared without melt filtration, the following process was used. OQ polycarbonate resin powder was mixed with the additives (e.g., heat stabilizer and mold release) and colorants using a mechanical tumbler until a homogenous mixture was obtained (typically 30 to 40 minutes for a 30 kg batch). The mixture was then extruded on a Werner and Pfleiderer ZSK—30 model twin-screw extruder. The extrusion conditions were: Zone 1=480° F.; Zone 2=500° F.; Zone 3=520° F.; Zone 4=540° F.; Zone 5=550° F.; Die head=550° F.; and Screw speed=400 to 450 revolutions per minute (rpm). The polymer strands exiting the die head were cooled using a water bath and pelletized to yield the finished highly colored resin.

For cases where samples were prepared using melt filtration the following process was used. OQ polycarbonate resin powder was blended with the colorants and 0.03 to 0.1 pph of heat stabilizer to form a mixture containing between 1 and 40% colorant. The mixture was then compounded using the same conditions as listed above on a 43 mm twin-screw co-rotating extruder to yield the color concentrate ("masterbatch"). The masterbatch contained from about 1% up to about 80% colorant based on the capability of the feeder on the production line. Typically, a dye loading between 10 and 30% was used. A loading of about 20% was most preferred for a feeder having good capability at a feed ratio of 99:1 (i.e. when the concentrate is fed at 1% of the actual line rate). It is important for color consistency to minimize the variability from the feeder. Consequently, in the final compounding step, the powder and additives (heat stabilizer and mold release) were fed to the extruder via a hopper and/or additive feeders. The concentrate was then fed to the line at a loading varying from 1 to 2% of the line rate.

Final compounding extruder detail were as follows.
  Extruder model/make—Werner & Pfleiderer (92 mm twin screw extruder)
  RPM used—580 RPM
  RPM max—580 RPM
  Amps used—700 Amps
  Amps Max.—800 Amps
  Rate (lb/h or kg/hr)—4200 lb/hr
  Temperature settings (for each zone)—420 (Z1), 440 (Z2), 460 (Z3), 480 (z4), 500 (z5), 520 (z6), 540 (z7), 565 (Melt filter), adapter @ 565C.

A 10-micron melt filter was used for the final compounding step in production.

Example 1

In the following example, we illustrate the effect of organic colorant quality on processing yields and quality of DVD9 discs. Solvent Red 207 from two different suppliers, Rose Color and Keystone, was used to make precolored resin formulations without using melt filtration as per the recipe disclosed in the table below. The resin was then molded into DVD9 discs on Sumitomo SD30 molding machines equipped with a Steag-Hamatech Unline 3000 DVD Bonder. An inline scanner Dr. Schenk unit (Model# VCC.ISM) was used to measure defects like inclusions, surface scratches, bonding defects, tilt etc., and to subsequently estimate inline processing yields. Such commercially available devices are pre-programmed with algorithms based on ECMA specifications to calculate yield.

TABLE 1

| | Formulations details | | | | |
|---|---|---|---|---|---|
| | Sample (parts by weight) | | | | |
| Formulation Details | A | B | C | D | E |
| Polycarbonate resin (average molecular weight Mw = 17700) | 100 | 100 | 100 | 100 | 100 |
| GMS = glycerol monostrearate | 0.03 | 0.03 | 0.03 | 0.03 | 0.03 |

TABLE 1-continued

Formulations details

| Formulation Details | Sample (parts by weight) | | | | |
|---|---|---|---|---|---|
| | A | B | C | D | E |
| Doverphos + bis (2,4-dicumyl phenyl) penta erthritol diphosphate. | 0.02 | 0.02 | 0.02 | 0.02 | 0.02 |
| Solvent Red 207 (Rose Color) | 0.1 | 0.4 | | | 0.016 |
| Solvent Red 207 (Keystone) | | | 0.1 | 0.4 | |
| Solvent Violet 36 | 0.025 | 0.1 | 0.025 | 0.1 | |
| Disperse Yellow 201 | | | | | 0.0024 |
| Vat Red 41 | | | | | 0.023 |
| Solvent Red 135 | | | | | 0.02 |

From Table 2, we see that formulations using Solvent Red 207 from Rose Color (Formulations A and B) show significantly lower process yields than formulations using the same colorant from Keystone (Formulations C and D). The major cause of loss in yield is attributed to the higher level of defects categorized as inclusions. Analytical testing results confirms that both Rose Color Solvent Red 207 formulations A and B had total metal contents from the colorant formulation of 1.16 and 4.62 ppm respectively, and a combined total of sodium, iron and calcium contents of 1.01 and 4.03 ppm, respectively. Keystone Red 207 formulations C and D had total metal contents of from the colorant formulation 0.47 and 1.87 respectively, and a combined total of sodium, iron and calcium of 0.36 and 1.43, respectively. The yield results (listed in Table 2 below) versus the total metal contents and the sodium, iron, and calcium content are plotted in FIGS. 1 and 2, respectively. FIG. 1 shows that yields do not begin to improve rapidly with decreasing impurity levels until the total metal impurities go below about 1.90 ppm. FIG. 2 shows that yields do not begin to improve rapidly with decreasing total iron, sodium and calcium impurity levels until such levels fall below about 1.50 ppm.

TABLE 2

Comparison of yields on non-melt filtered resin (Rose Color SR207 vs. Keystone SR207)

| | Yield (%) |
|---|---|
| Formulation A | 29 |
| Formulation B | 15 |
| Formulation C | 59 |
| Formulation D | 18 |

Example 2

In an effort to improve process yield, the method of producing the resin was further modified to include a melt filtration step. The melt-filtered resin was again molded into DVD9 discs and in-process yields were measured as before.

TABLE 3

Comparison of yields on melt filtered resin (Rose Color SR207 vs. Keystone SR207) having otherwise the same formulations as listed in Table 1.

| | Yield % |
|---|---|
| Formulation E[1] | 88 |
| Formulation C[1] | 95 |
| Formulation D[1] | 93 |

It is clear that the additional melt-filtration step allows for the production of high quality resin which improves yields. Formulation C[1] (i.e., melt filtered formulation C) has the lowest total metal impurities from the colorant formulation of 0.47 ppm and combined iron, sodium and calcium impurities of 0.36 ppm. Formulation D[1] has 1.88 ppm total metal impurities from the colorant formulation and 1.44 ppm combined iron, sodium and calcium metal impurities from the colorant formulation, while Formulation E[1] has a combined total metal impurities of 1.28 ppm and a combined total of iron, sodium and calcium metals of 1.44 ppm from the colorant formulation. The results show that to achieve 95% yield or greater, total metal impurities need to below 1.88 ppm and combined iron, sodium and calcium impurities need to be below about 1.25 ppm.

Example 3

The method of producing the resin has an impact not only on the process yields but also on the functionality and performance of DVD9 discs as illustrated in the example below. The functionality and quality of a DVD9 disc can be measured in terms of the total number of PISum8 errors as defined in the DVD specifications established by the ECMA. It is typical that high quality discs exhibit PISum8 values of less than 140, with an average of less than 50 in the as-molded condition, and PISum8 values within DVD specifications (i.e., less than 280) with an average of less than 140, following environmental exposure as per standard tests. PISum8 tests are standard in the industry and can be performed by commercially available machines sold by Dr. Schenk for example.

Melt-filtered resins processed as per the formulations disclosed in Table 4 were molded into DVD9 discs and tested on an electrical tester (DVDPRO) for PISum8 errors. The DVD test results shown in Table 5.

TABLE 4

Formulation details

| Formulation Details | Sample (parts by weight) | |
|---|---|---|
| | F | G |
| Polycarbonate resin (average molecular weight Mw = 17700) | 100 | 100 |
| GMS (glycerol monosterate) | 0.03 | 0.03 |
| Doverphos (phosphate Stabilizers) | 0.02 | 0.02 |
| Solvent Yellow 98 | 0.085 | |
| Solvent Orange 63 | 0.00045 | |
| Solvent Red 207 | | 0.016 |
| Disperse Yellow 201 | | 0.0024 |
| Vat Red 41 | | 0.023 |
| Solvent Red 135 | | 0.02 |

TABLE 5

PISum8 values prior to and post-environmental exposure for Formulations F and G

| | F | | G |
|---|---|---|---|
| Layer | PISum8 Avg (Max) | Layer | PISum8 Avg (Max) |
| Pre-environmental testing | | | |
| Layer 0 | 5 (22) | Layer 0 | 21 (78) |
| Layer 1 | 18 (106) | Layer 1 | 48 (156) |
| Post-environmental testing | | | |
| Layer 0 | 29 (58) | Layer 0 | 136 (222) |
| Layer 1 | 30 (134) | Layer 1 | 118 (261) |

*First number is the as-molded PISum8 value, the bracketed number is the PISum8 alue after environmental exposure.

Formulation F with total metal contents and iron, sodium and calcium contents of less than 0.06 ppm is seen to meet the required PISum8. Formulation G is seen to produce poor quality DVD9 discs with high PISum8 values, especially following environmental exposure. Despite the fact that the resin was melt-filtered, high ionics in Vat Red 41 (3000 ppm Ca, 2100 ppm Fe and 308 ppm Na), which resulted in Formulation G having greater than 3 ppm total iron, sodium and calcium metal impurities from the colorant formulation, were found to reduce resin quality resulting in poor disc performance.

Example 4

From the three preceding examples, it is clear that disc quality is dependent on the metal impurities coming from the colorant formulation in the finished highly colored resin. However, we have also observed that there is no linear correlation between particulate counts in the concentrate and particulate counts in the final product which allows us to predict final level of particulates since the extrusion process involves additional phenomena (heat, shear) that could potentially introduce additional particulates in the finished product. Table 6 and 7 show particulate count data for 10 different concentrates and the corresponding particulate counts for the finished product.

TABLE 6

Particulate counts of concentrates

| Particulate counts | 1 | 2 | 3 | 4 | 5 | 6 | 7 | 8 | 9 | 10 |
|---|---|---|---|---|---|---|---|---|---|---|
| PT 1–3 | 5995 | 856 | 2239 | 1988 | 1549 | 6495 | 1753 | 7308 | 73548 | 85952 |
| PT 3–5 | 443 | 110 | 390 | 239 | 103 | 860 | 216 | 972 | 12682 | 12795 |
| PT 5–10 | 207 | 57 | 188 | 79 | 43 | 327 | 66 | 665 | 4775 | 1452 |
| PT 10–150 | 49 | 17 | 35 | 14 | 13 | 109 | 18 | 142 | 97 | 67 |

TABLE 7

Particulate counts of finished product

| Particulate counts | 1 | 2 | 3 | 4 | 5 | 6 | 7 | 8 | 9 | 10 |
|---|---|---|---|---|---|---|---|---|---|---|
| PT 1–3 | 7483 | 5325 | 3674 | 6194 | 6526.5 | 8018 | 3138 | 9856 | 81078 | 88518 |
| PT 3–5 | 264 | 689 | 339 | 595.5 | 746.5 | 849 | 280 | 432.5 | 6985 | 7815 |
| PT 5–10 | 200 | 284 | 133 | 236 | 262 | 274 | 93 | 140.5 | 473 | 807 |
| PT 10–150 | 43 | 65 | 31 | 49 | 66 | 59 | 7 | 45 | 14 | 93 |

Formulations 1 through 8 were used to produce high quality custom colored DVD discs, whereas Formulations 9 and 10 produced discs which will failed the PISum8 specifications. These results show that when the metal impurities from the colorant formulations meet the requirements of 1.5 and 1.25 ppm levels for total metals and combined iron, sodium and calcium, the color concentrates produced from these colorant formulations preferably meet the following particulate levels to produced high quality, highly colored DVDs.

PT 1–3<7308 counts
PT 3–5<972 counts
PT 5–10<665 counts
PT 10–150<109 counts

Metal analysis for the above-reported samples are performed by digesting polycarbonate by heating a sample of 0.45 grams in 6 ml of nitric acid ($HNO_3$) followed by addition of 1 nl of hydrochloric acid (HCl). Samples were then neutralized in an ICP Spectometer and results were compared to standards.

The following claims should be read in view of the total specification's teachings and should not be read as limited to any particular embodiment or example described herein.

What is claimed is:

1. A method for producing a highly colored DVD substrate comprising combining an optical quality polycarbonate resin with a colorant formulation to form a highly colored polycarbonate mixture wherein the colorant formulation is present in an amount of at least of 0.15% wt of the highly colored polycarbonate mixture and wherein the total of the metal impurities from the colorant formulation in the highly colored polycarbonate mixture is less than 1.90 ppm and more than 0.04 ppm.

2. The method according to claim 1 wherein the colorant formulation is present in an amount of less than 0.4 wt % of the highly colored polycarbonate mixture.

3. A method for producing a highly colored DVD substrate comprising combining an optical quality polycarbonate resin with a colorant formulation to form a highly colored polycarbonate mixture wherein the colorant formulation is present an amount of at least 0.15 wt % of the highly colored polycarbonate mixture and wherein the combined total of iron, sodium, and calcium metal impurities from the colorant formulation in the highly colored polycarbonate mixture is less than 1.90 ppm more than 0.04 ppm.

4. The method according to claim 2 wherein the colorant formulation is present in an amount of less than 0.4 wt % of the highly colored polycarbonate mixture.

5. A method for producing a highly colored DVD substrate comprising the step of combining an optical quality polycarbonate resin with a colorant formulation to form a highly colored polycarbonate mixture wherein the colorant formulation is present in an amount of at least of 0.15 wt % of the highly colored polycarbonate mixture and wherein the total metal impurities from the colorant formulation in the highly colored polycarbonate mixture is less than 1.90 ppm and more than 0.04 ppm wherein said combining step comprises adding a color concentrate to the optical quality polycarbonate resin.

6. The method according to claim 5 wherein the colorant formulation is present in an amount of less than 0.4 wt % of the highly colored polycarbonate mixture.

7. A highly colored optical disk comprising:
   (i) a first substrate,
   (ii) a second substrate
   (iii) a bonding layer, and
   (iv) a data layer,
   wherein the bonding layer and data layer are disposed between the first substrate and the second substrate, wherein the data layer has a shape configured to correspond to meaningful data when read by detecting reflections of a laser beam incident upon the first substrate, wherein the first substrate comprises a highly colored polycarbonate mixture comprising an optical quality polycarbonate resin and a colorant formulation in the range of at least 0.15 weight % of the highly colored polycarbonate wherein the total metal impurities in the highly colored polycarbonate mixture is less than 1.90 ppm and more than 0.04 ppm.

8. The highly colored DVD according to claim 7 wherein the first substrate has a UV Bonding Index of greater than or equal to 5.

9. The highly colored DVD substrate according to claim 7 wherein the colorant formulation is present in an amount of less than 0.4 wt % of the highly colored polycarbonate mixture.

10. The highly colored DVD substrate according to claim 9 wherein the disk has a PISUM8 test value of less than 280 after aging at 80° C. and 85% relative humidity for 4 days.

11. A highly colored DVD comprising:
    (i) a first substrate,
    (ii) a second substrate
    (iii) a bonding layer, and
    (iv) a data layer,
    wherein the major bonding layer and data layer are disposed between the first substrate and the second substrate, wherein the data layer has a shape configured to correspond to meaningful data when read by detecting reflections of a laser beam incident upon the first substrate, wherein the first substrate comprises a highly colored polycarbonate mixture comprising an optical quality polycarbonate resin and a colorant formulation in the range of 0.15 to 0.4 weight % of the highly colored polycarbonate wherein said DVD is made by a process comprising the step of adding a colorant formulation to the optical quality polycarbonate resin wherein the total metal impurities from the colorant formulation in the highly colored polycarbonate mixture is less than 1.50 ppm and more than 0.04 ppm.

12. The highly colored DVD substrate according to claim 11 wherein the disk has a PISUM8 test value of less than 280 after aging at 80° C. and 85% relative humidity for 4 days.

* * * * *